(12) United States Patent  (10) Patent No.: US 8,160,247 B2
Agrawal et al.  (45) Date of Patent: Apr. 17, 2012

(54) PROVIDING LOCAL STORAGE SERVICE TO APPLICATIONS THAT RUN IN AN APPLICATION EXECUTION ENVIRONMENT

(75) Inventors: Sunil C. Agrawal, Milpitas, CA (US);
William Ie, Mountain View, CA (US);
Jason Boyer, Lexington, MA (US)

(73) Assignee: Adobe Systems Incorporated, San Jose, CA (US)

( * ) Notice: Subject to any disclaimer, the term of this patent is extended or adjusted under 35 U.S.C. 154(b) by 1237 days.

(21) Appl. No.: 11/863,189

(22) Filed: Sep. 27, 2007

(65) Prior Publication Data
US 2009/0086964 A1    Apr. 2, 2009

(51) Int. Cl.
*H04L 9/00* (2006.01)
*G06F 12/14* (2006.01)
(52) U.S. Cl. ............................. 380/44; 713/193; 726/1
(58) Field of Classification Search .................. 380/44; 713/193; 726/1
See application file for complete search history.

(56) References Cited

U.S. PATENT DOCUMENTS

| | | | |
|---|---|---|---|
| 6,148,407 A | | 11/2000 | Aucsmith |
| 6,286,008 B1 * | | 9/2001 | Matsumoto et al. ... 707/999.102 |
| 6,760,441 B1 * | | 7/2004 | Ellison et al. .................. 380/45 |
| 7,313,814 B2 * | | 12/2007 | Zhu et al. ........................... 726/6 |
| 7,715,565 B2 * | | 5/2010 | Kimmel et al. ................ 380/281 |
| 2005/0149730 A1 * | | 7/2005 | Aissi et al. ..................... 713/168 |
| 2006/0083369 A1 * | | 4/2006 | Lee .................................. 380/28 |
| 2007/0180268 A1 | | 8/2007 | Filimon et al. |

FOREIGN PATENT DOCUMENTS
EP    1637958    3/2006

OTHER PUBLICATIONS

European Patent Office, in PCT Patent Application PCT/US2008/0774008, International Search Report and Written Opinion mailed Jan. 21, 2009, 15 pages.
Wikipedia, *Shamir's Secret Sharing*, http://en.wikipedia.org/wiki/Shamir%27s_Secret_Sharing, 5 pages, Aug. 14, 2007.
NAI Labs, Network Associates, Inc., *Windows Data Protection*, http://msdn2.microsoft.com/en-us/library/ms995355(d=printer).aspx, 14 pages, Oct. 2001.

(Continued)

*Primary Examiner* — Zachary A Davis
(74) *Attorney, Agent, or Firm* — Fish & Richardson P.C.

(57) ABSTRACT

Methods, systems, and apparatus, including medium-encoded computer program products, for providing local storage service to applications that run in an application execution environment. In one aspect, a method includes receiving a request from one of the applications, wherein the request triggers local storage of information; obtaining an encryption key based on identifiers including a first identifier corresponding to the application execution environment, a second identifier corresponding to the one application, and a third identifier corresponding to the computing apparatus; encrypting the information using the encryption key; and storing the encrypted information in the computing apparatus.

18 Claims, 4 Drawing Sheets

OTHER PUBLICATIONS

Wikipedia, *HMAC*, http://en.wikipedia.org/wiki/HMAC, 4 pages, Aug. 15, 2007.

Developer Connection, *Introduction to Keychain Services Programming Guide*, http://developer.apple.com/documentation/Security/Conceptual/keychainServConcepts, 2 pages, Aug. 1, 2007.

Developer Connection, *Keychain Access Controls*, http://developer.apple.com/documentation/Security/Conceptual/keychainServConcepts , 3 pages, Aug. 1, 2007.

Developer Connection, *Keychain Services Concepts*, http://developer.apple.com/documentation/Security/Conceptual/keychainServConcepts, 3 pages, Aug. 1, 2007.

Developer Connection, *Keychain Services Reference*, http://developer.apple.com/documentation/Security/Reference/keychainservices/Reference, 75 pages, Aug. 1, 2007.

Wikipedia, *Secret Sharing*, http://en.wikipedia.org/wiki/Secret_sharing, 6 pages, Aug. 8, 2007.

\* cited by examiner

PROVIDING LOCAL STORAGE SERVICE TO APPLICATIONS THAT RUN IN AN APPLICATION EXECUTION ENVIRONMENT

BACKGROUND

The present disclosure relates to providing local storage services to applications. Electronic data can be protected or encrypted using various methods. Cryptographic techniques have been employed to protect personal data, confidential information, and to control the distribution and usage of electronic data. Some forms of electronic data, especially electronic media files, are protected using various digital rights management (DRM) implementations. DRM can allow the owner of digital media content to control which persons and/or devices may access a digital media file. Some implementations of DRM allow the owner of digital media content to control the timeframe in which a media file may be accessed and/or control the number of times a file may be opened.

Moreover, the ADOBE® ACROBAT® program has provided local data caching services, where the local data caching is bound to a current user of the program by employing data protection functions available through an operating system. On the Microsoft WINDOWS® Operating System, an application programming interface (API) called the Data Protection Application Programming Interface (DPAPI) provides data protection functions. DPAPI functions include file encryption using a computer user's login password to control access to one or more files. The Apple MAC OS® X platform offers Keychain Services to provide data encryption functions. Keychain Services provides secure storage of passwords, keys, certificates, and notes for one or more users. A user can unlock a keychain with a single password, and any Keychain Services aware application can then use that keychain to store and retrieve passwords.

SUMMARY

This specification describes technologies relating to providing local storage service to applications that run in an application execution environment.

In general, one or more aspects of the subject matter described in this specification can be embodied in one or more methods for providing local storage service to applications that run in an application execution environment on a computing apparatus, the method(s) including receiving a request from one of the applications, wherein the request triggers local storage of information; obtaining an encryption key based on identifiers including a first identifier corresponding to the application execution environment, a second identifier corresponding to the one application, and a third identifier corresponding to the computing apparatus; encrypting the information using the encryption key; and storing the encrypted information in the computing apparatus. Other embodiments include corresponding systems, apparatus, and computer program products.

These and other embodiments can optionally include one or more of the following features. The method can include retrieving the third identifier using a (k,n) threshold secret sharing scheme. The method can include receiving a security level indication for the information, and the obtaining can include obtaining the encryption key based on the identifiers including the first identifier, the second identifier, the third identifier, a fourth identifier corresponding to the security level indication, and a fifth identifier corresponding to a current user of the one application. Moreover, the application execution environment can include a cross-operating system (OS) application execution environment, and receiving the security level indication can include receiving a request from a requestor to store the information, wherein the security level indication corresponds to the requestor being either the one of the applications or the cross-OS application execution environment.

Obtaining the encryption key can include generating a composite key using the identifiers as input. The method can include generating the second identifier dynamically by applying a cryptographic hash function to program code composing at least a portion of the one application. The identifiers can include encryption keys, and generating the composite key can include combining the encryption keys to form the composite key.

Particular embodiments of the subject matter described in this specification can be implemented to realize one or more of the following advantages. An application execution environment can provide local storage service to applications that run in the application execution environment, where the information to be stored locally is encrypted such that the encrypted information is bound to the application execution environment, a specific application running in the application execution environment, and the computing apparatus on which the application execution environment is installed. Thus, applications' access to each other's local storage cache can be restricted even when running in the same application execution environment on the same computing apparatus.

In addition, the encrypted information can be bound to the current user of the application and to a security level associated with a request for the local information storage. Thus, the application execution environment can provide local storage to all the applications running on top of the application execution environment, where the information stored locally can be tied to (1) the application execution environment (i.e., the application execution environment is required to access the information), (2) the application (i.e., only the application that triggers the information storage can access it), (3) the computing apparatus (i.e., the information cannot be copied to another computer and still be accessible), (4) the current user (i.e., the same application running on the same computer cannot access the information if a different user is logged in), and (5) the security level (e.g., certain data stored on behalf of the application can be treated as highly confidential and never allowed to cross a security boundary between the application execution environment and the application).

The encryption of information, as described, can provide tamper detection and/or resistance. By encrypting information, the information can be made more difficult to be read and/or modified by a malicious user. For example, a malicious user would have difficulty finding license keys, passwords, or other information in an encrypted file. The malicious user may also have difficultly modifying encrypted data, for example, to extend the duration of a digital license by changing an expiration date. If an encrypted file were tampered with or otherwise modified or damaged, such changes can be detected. For example, the file may contain a digital signature, checksum, or other data that may be used to detect if a file has been altered without the use of the encryption process.

Access to electronic files can be more closely controlled to improve the enforcement of digital licensing agreements. For example, a digital media file (e.g., music, video, ring tones) may be licensed for use only by a specified user on a specified device to prevent unauthorized distribution or presentation of the media by other users or on other devices. Access to electronic files can be restricted to one or more specified users on a specified machine to protect the integrity of the digital file. For example, a file that contains confidential information can be copied to another device, but the file can not be opened on that device even if the authorized user's password information has been compromised. The methods described herein may also be used to protect the integrity of digital files from attack by modified hardware. In some cases, users may modify existing hardware platforms to gain unauthorized access or privileges to digital files. For example, such a user may obtain a legal copy of a file and then attempt to override a timeout or playback limit by modifying the playback (e.g., resetting an internal clock, adding circuitry to override protection limits or to impersonate another user). The methods described in this document can be utilized to detect alterations made to the hardware platform and prevent access to the file.

The details of one or more embodiments of the invention are set forth in the accompanying drawings and the description below. Other features, aspects, and advantages of the invention will become apparent from the description, the drawings, and the claims.

DETAILED DESCRIPTION

Figure 1:
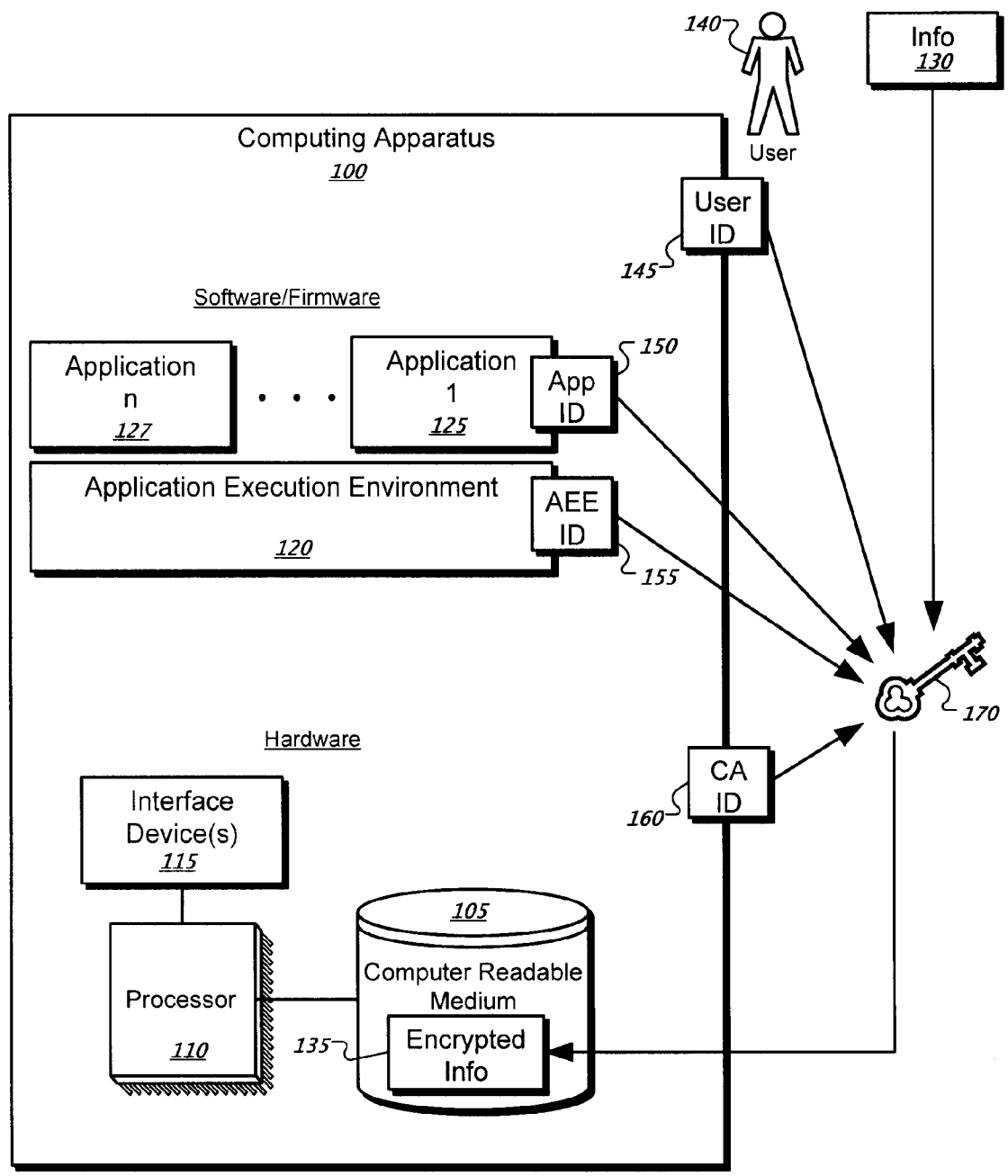
FIG. 1 shows an example computing apparatus that provides local storage service to applications that run in an application execution environment.

FIG. 1 shows an example computing apparatus 100 that provides local storage service to applications that run in an application execution environment. In general, data that is stored by the local storage service may be secured by one or more cryptographic keys that depend on a combination of multiple identifiers. Some or all of the identifiers are required to be known before the data may be secured or unsecured.

The computing apparatus 100 includes hardware such as a computer readable medium 105 (e.g., hard disk, memory, flash storage), a processor module 110, and one or more interface devices 115 (e.g., display, keyboard, mouse). The computing apparatus 100 also includes software and/or firmware such as an application execution environment (AEE) 120, and one or more applications such as an application "1" 125 through an application "n" 127. In some implementations, the application execution environment 120 may be the operating system of the computing apparatus 100. Thus, the application execution environment 120 can be the low-level software that handles the interface to the hardware and presents a default interface to the user when no application program is running.

In some implementations, the application execution environment 120 can be a program that runs within the operating system of the computing apparatus 100. For example, the application execution environment 120 can be the Adobe® Integrated Runtime (AIR™) environment available from Adobe System Incorporated of San Jose, Calif., or other software platforms that support the execution of applications such as the application "1" 125.

A collection of information 130, such as an electronic file or other data, needs to be saved in the computing apparatus 100 in secure local storage. The information 130 is to be stored as a collection of encrypted information 135 in the computer readable medium 105. The information 130 is encrypted using one or more keys obtained in accordance with a collection of identifiers. For example, one such identifier can be a user ID 145 corresponding to a user 140. In some implementations, the user ID 145 can be a password, login identification, biometric data, a personal identification number (PIN), a hardware security key (e.g., a "dongle", a "smart" card,) or combinations of these and/or other information that may be used to identify the user 140. In some implementations, the user ID 145 may be generated and stored on the computing apparatus 100 the first time the user ID 145 is requested.

The information 130 is also secured based on an application ID 150, an application execution environment ID 155, and a computing apparatus ID 160. The application ID 150 is information that uniquely identifies the application "1" 125. In some implementations, the application ID 150 can be derived from data that is part of the application "1" 125 (e.g., hard coded data), a registry key, a value that is generated by the application "1" 125 at runtime, a value that is generated by an installation program that installed the application "1" 125, by a hash (e.g., Secure Hash Algorithm (SHA)) or checksum value of the application "1" 125, or by other data that may be used to identify the application "1" 125. In some implementations, the application ID 150 can identify the application "1" 125, the application "1" 125 and the version of the application "1" 125, a license given to one or more instances of the application "1" 125, an individual installation of the application "1" 125 (e.g., a random number generated at the time of installation), or other data that may be used to identify the application "1" 125. In some implementations, the application ID 150 may be embedded within the code of the application "1" 125 and obfuscated to prevent the application ID 150 from being revealed through static or dynamic analysis.

The application execution environment ID 155 is data that can be used to identify the application execution environment 120. In some implementations, the application execution environment ID 155 can be derived from data that is part of the application execution environment 120 (e.g., hard coded data), a registry key, a value that is generated by the application execution environment 120 at runtime, a value that is generated by an installation program that installed the application execution environment 120, by a hash (e.g., SHA) or checksum value of the application execution environment 120, or by other data that can be used to identify the application execution environment 120. In some implementations, the application execution environment ID 155 can identify the application execution environment 120, the application execution environment 120 and the version of the application execution environment 120, a license given to one or more instances of the application execution environment 120, an individual installation of the application execution environment 120 (e.g., a random value generated at the time of installation), or other data that may be used to identify the application execution environment 120. In some implementations, the application execution environment ID 155 may be embedded within the code of the application execution environment 120 and obfuscated to prevent the application execution environment ID 155 from being revealed through static or dynamic analysis.

The computing apparatus ID 160 identifies the computing apparatus 100. For example, the computing apparatus ID 160 can be a serial number provided by the processor module 110, an identifier provided by the computer readable medium 105, a hardware security key (e.g., a "dongle"), a network media access control (MAC) address, or a combination of these and/or other data that can be used to identify the computing apparatus 100.

The user ID 145, the application ID 150, the application execution environment ID 155 and the computing apparatus ID 160 can be used to identify or form a security key 170. The security key 170 is used in an encryption process to secure the information 130 and store it in the computer readable medium 105 as the encrypted information 135. The encryption process can be performed in whole, or in part, in an encryption engine included in the application execution environment 120. Moreover, the encrypted information 135 is accessible only through the application execution environment 120, when the appropriate identifiers are present.

The above description includes the use of the user ID 145, however, in some implementations, no user ID 145 is necessary. For example, cellular phones, personal digital assistants (PDAs), set top boxes, or other devices may not identify the user (e.g., the devices may have no login process). Therefore, in some implementations, the security key 170 can be derived from the application "1" ID 150, the application execution environment ID 155, and the computing apparatus ID 160.

Figure 2:
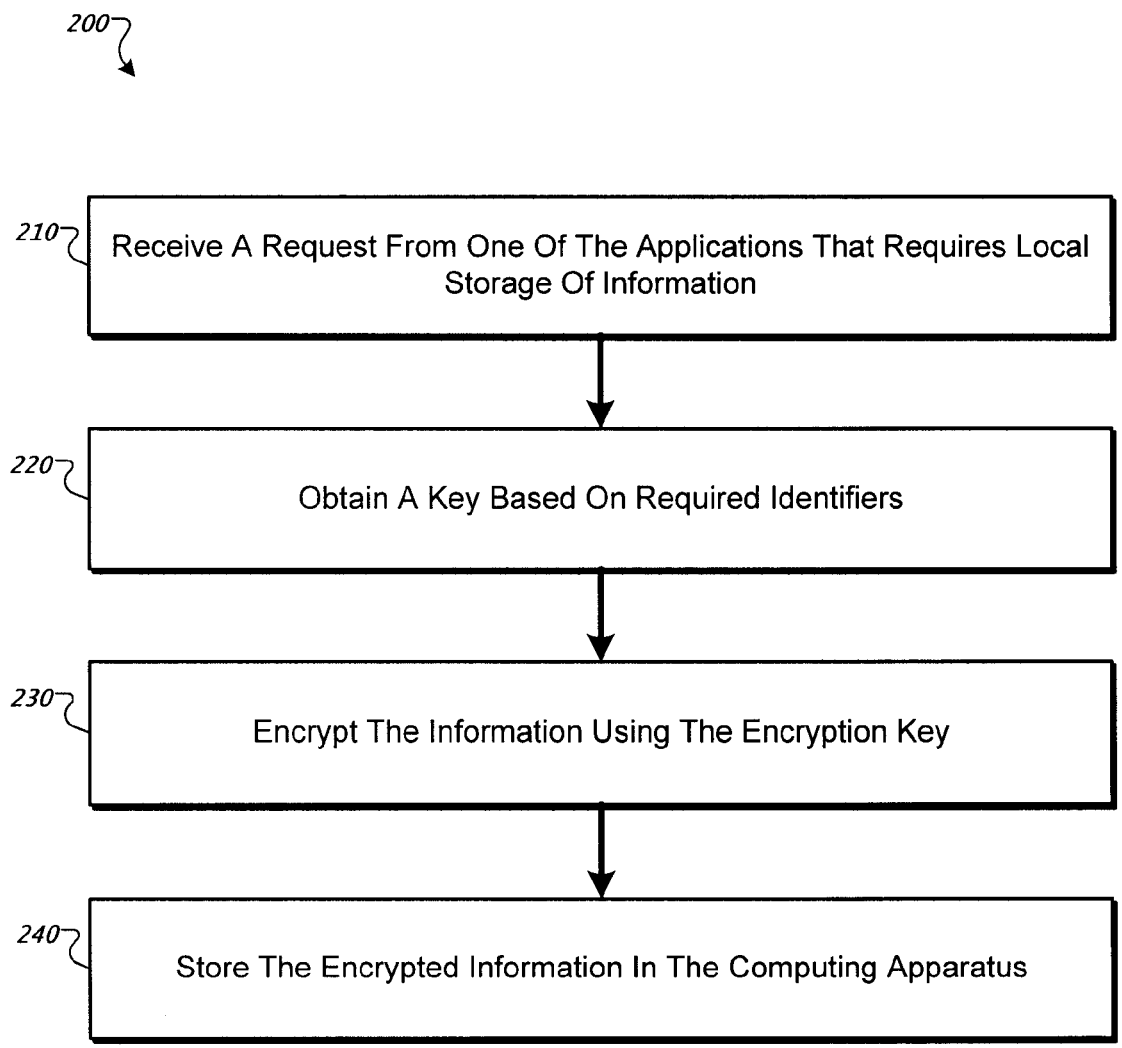
FIG. 2 shows an example process of providing local storage service to applications that run in an application execution environment.

FIG. 2 shows an example process 200 of providing local storage service to applications that run in an application execution environment. A request can be received 210 from one of the applications that requires local storage of information. The application runs in the application execution environment (e.g., the application 125 of FIG. 1), and the request can be for the local storage of information, or the request can be for some other service, which results in a need for the local storage of information. For example, in the latter case, the request from the application can cause the application execution environment (e.g., the application execution environment 120 of FIG. 1) to make its own request for local storage service in order to support the application's request.

A key is obtained 220 based on required identifiers. The key is located or derived based on the identity of the requesting application, the identity of an application execution environment upon which the application is running, and the identity of the computing apparatus that is running the application execution environment. In some implementations, the key can also be located or derived based on the identity of a user. For example, a user may log onto the computing apparatus, and the user's login information can be used to provide identification information for use in the encryption process. In some implementations, the key can also be located or derived based on a security level indicator. For example, the encryption key can be different if the local storage request was made by the application versus the application execution environment.

The information is encrypted 230 using the encryption key. Various symmetric or asymmetric encryption methods can be used to encrypt the information. For example, the information can be encrypted using AES (Advanced Encryption Standard), RSA (Rivest, Shamir, Adleman), PGP (Pretty Good Privacy), or other cryptographic techniques. In some examples, encryption can be performed in part using an operating system facility provided in the computing apparatus, extensions to the operating system, or other computer codes that may be available for encrypting data.

The encrypted information is stored 240 in the computing apparatus. The encrypted information can be stored on a hard disk, volatile and/or nonvolatile memory, or other data storage medium. The encrypted information can be stored for many different reasons, and in general, the storage facility provided by the application execution environment can be used by applications for many different purposes. Nonetheless, a detailed example is now described in the context of digital rights management.

Figure 3:
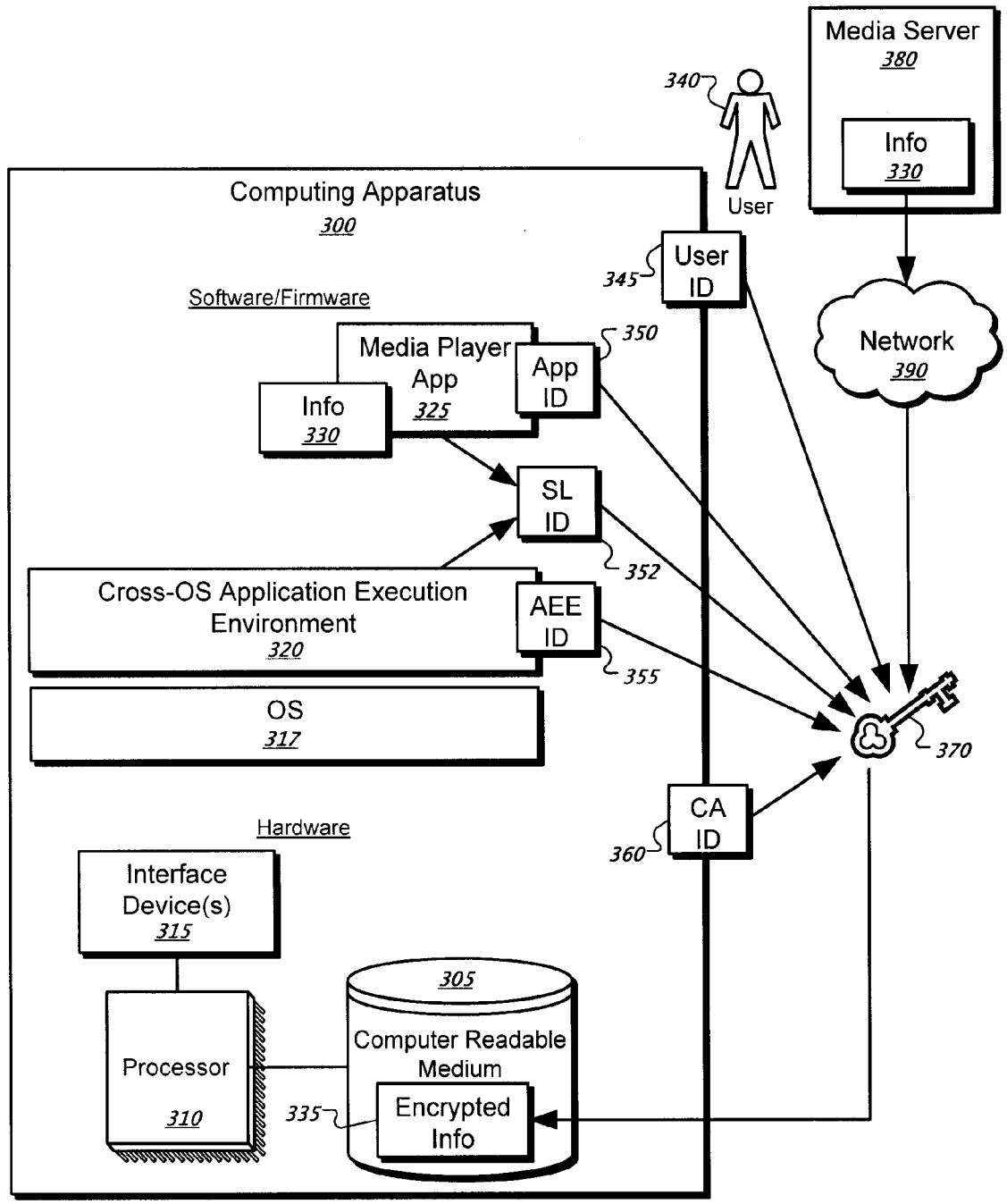
FIG. 3 shows an example media content delivery system.

FIG. 3 shows an example media content delivery system. The system includes a computing apparatus 300. In some implementations, the computing apparatus 300 can be the computing apparatus 100 of FIG. 1. The computing apparatus 300 includes hardware such as a computer readable medium 305 (e.g., hard disk, memory, flash storage), a processor module 310, and one or more interface devices 315 (e.g., display, keyboard, mouse). The computing apparatus 300 also includes software and/or firmware such as an operating system (OS) 317, a cross-OS application execution environment 320, and a media player application 325.

The cross-OS application execution environment 320 is a program that runs within the operating system 317 of the computing apparatus 300. For example, the cross-OS application execution environment 320 can be the AIR™ runtime environment available from Adobe System Incorporated of San Jose, Calif., or other software platforms that support the execution and/or interpretation of applications across multiple operating systems.

Access to the computer readable medium 305 can be provided in various ways. For example, the cross-OS execution environment 320 can access file storage APIs that are provided by the OS 317. The cross-OS execution environment 320 can use file storage features that are provided by other applications that run on the OS 317.

The media player application 325 and/or the cross-OS application execution environment 320 can request to have information 330 encrypted and stored as encrypted information 335. A security key 370 can be formed by a combination of a user ID 345, a media player ID 350, a security level ID 352, a cross-OS application execution environment ID 355, and a computing apparatus ID 360. This security key 370 can then be used to encrypt the information 330 before storage as encrypted information 335.

The information 330 can be provided by a media server 380 or by the media player application 325. For example, the information 330 can be media content (e.g., audio and video data), content usage rights data, content encryption information (e.g., an encryption key for content to be delivered by the media server 380), or a combination of these, received from the media server 380 over a network 390 (e.g., a local area network, the Internet, a cellular telephone network, a cable or satellite television network). Alternatively, the information 330 can be generated by the media player application 325, such as an audit record describing which media content from the server 380 has been displayed for viewing by the user 340.

Some or all of the information 330 can be encrypted using one or more keys, including an encryption key 370, obtained in accordance with a collection of identifiers. The encryption key 370 can include one, some, or all of the IDs 345-360. A subset of the IDs 345-360 can be combined, Cored, hashed, or otherwise integrated to form the encryption key 370 as a composite security key. For example, one of the IDs 345-360 can be encrypted using another of the IDs 345-360 as an encryption key, and the result can be encrypted using yet another of the IDs 345-360 as an encryption key, and so on, until a final result is the key 370. Alternatively, the encryption key 370 can be selected from multiple available keys based on the IDs 345-360 and retrieved. For example, the multiple available keys, including encryption key 370, can be embedded within the code of the cross-OS application execution environment 320 and obfuscated to prevent the keys from being revealed through static or dynamic analysis.

In some implementations, the information 330 can be stored, encrypted, and decrypted by the cross-OS application execution environment 320. As noted above, this can be done on behalf of the cross-OS application execution environment 320 itself, or on behalf of the media player application 325. The cross-OS application execution environment 320 can perform encryption operations on data used to support other services provided to the media player application 325 (e.g., local encryption and caching of an encryption key provided by the media server 380). The media player application 325 can effect storage, encryption, and decryption of its own data by sending a request to the cross-OS application execution environment 320 so the cross-OS application execution environment 320 can store, encrypt, or decrypt the application's data as requested.

The user ID 345 is an identifier corresponding to a user 340, such as the user ID 145 described above. In some implementations, the user ID 345 can be retrieved from the OS 317. The application ID 350 is an identifier that uniquely identifies the media player application 325, such as the application ID 150 described above. Use of the application ID 350 can prevent the encrypted data 335 from being read by an application other than the media player application 325. For example, another media player application (different than the media player application 325) will have an application ID that is different from the application ID 350, and the different application ID, when combined with the IDs 345, 352, 355, and 360, will form a new security key that differs from the security key 370. Since the new security key and the security key 370 do not match, the encrypted information 335 cannot be read by applications other than the media player application 325, even if the other application is also a media player application and all the other IDs are the same.

The security level ID 352 is an identifier that can be used to identify a security level associated with the requestor of local storage service. For example, an application (e.g., the media player application 325) can be given a different security level than the cross-OS application execution environment 320. In some implementations, the cross-OS application execution environment 320 can be executed from compiled computer code, while applications that run on the cross-OS application execution environment 320 (e.g., the media player application 325) can be interpreted applications. In some implementations, the code that forms the applications (e.g., the media player application 325) may be less secure than the code that forms the cross-OS application execution environment 320. In this example, the cross-OS application execution environment 320 may be less prone to attack (e.g., "hacking") by malicious users, and can therefore be given a higher security level than the media player application 325. Moreover, in many implementations, the cross-OS application execution environment 320 can be given a higher security level than the applications running on it because of the nature of the data being secured (e.g., the cross-OS application execution environment 320 may be locally caching data that, if compromised, would be of greater concern).

The cross-OS application execution environment ID 355 is data that can be used to identify the cross-OS application execution environment 320, such as the application execution environment ID 155 described above. Thus, the cross-OS application execution environment ID 355 can be derived from data that is part of the cross-OS application execution environment 320 (e.g., hard coded data), a registry key, a value that is generated by the cross-OS application execution environment 320 at runtime, a value that is generated by an installation program that installed the cross-OS application execution environment 320, by a hash (e.g., SHA) or checksum value of the cross-OS application execution environment 320, or by other data that can be used to identify the cross-OS application execution environment 320. In some implementations, the cross-OS application execution environment ID 355 can identify the cross-OS application execution environment 320, the cross-OS application execution environment 320 and its version, a license given to one or more instances of the cross-OS application execution environment 320, an individual installation of the cross-OS application execution environment 320 (e.g., a random value generated at the time of installation), or other data that may be used to identify the cross-OS application execution environment 320.

The computing apparatus ID 360 is an identifier that can identify the computing apparatus 300, such as the computing apparatus ID 160 described above. When the computing apparatus ID 360 is used to obtain the security key 370, the encrypted information 335 cannot be copied to and read on another computing device. For example, the computing apparatus 300 can be uniquely identified by the computing apparatus ID 360, and the computing apparatus ID 360 can be combined with the IDs 345, 350, 352, and/or 355 to form the security key 370 that is used to encrypt and/or decrypt the encrypted information 335. If the encrypted information 335 is copied to another computing device, the other computing device will give rise to a different computing device ID and security key, and the different security key cannot be used to access the encrypted information 335.

In some implementations, the computing apparatus 300 can be subject to change. For example, the processor module 310 can be replaced by a faster version, a video card can require replacement, or a hard drive can be upgraded to provide increased storage capacity. By modifying the computing apparatus 300, the computing apparatus ID 360 can change and prevent access to the encrypted information 335, even when such access should be allowed. Thus, in some implementations, the computing apparatus ID 360 can be linked to multiple components that make up the computing apparatus 300, where some of those components can be changed without causing the computing apparatus to be considered a new computing apparatus. For example, the computing apparatus ID 360 can be stored using a (k,n) threshold secret sharing scheme. By using a (k,n) scheme, the computing apparatus 300 can be modified in some ways while leaving the computing apparatus ID 360 unchanged and still recoverable.

For example, the computing apparatus 300 can have access to ten separate attributes that correspond to individual components of the computing apparatus 300 (e.g., attributes for the processor module 310, a motherboard identifier, a hard drive serial number, a MAC address, etc.). The (k,n) threshold secret sharing scheme can produce the same value for the computing apparatus ID 360 as long as seven or more of the ten component attributes remain unchanged.

But, for example, if fewer than seven of the ten component attributes remain unchanged, the (k,n) scheme can identify the computing apparatus 300 as a different computing apparatus.

While the (k,n) scheme is described as using the values of "7" and "10," the values of k and n can be any values where k is less than or equal to n.

The computing apparatus ID 360 can be a randomly generated value, which is then protected using a (k,n) threshold secret sharing scheme. For k of n, where k is the minimum number of device attributes that must match and n is the number of device attributes used for device binding, n secret shares can be computed. SecretShare[i] can then be encrypted with a key derived from DeviceAttribute[i] (e.g., encrypted with the hash of DeviceAttribute[i]), and the encrypted secret shares can be stored for later access. When each of the n attributes is retrieved from the apparatus at a later time, each attribute can be used to decrypt its own share, which is then combined with the other shares to recover the computing apparatus ID 360.

In this case, a number of device attributes equal to k is required in order to recover the computing apparatus ID 360. If more than n minus k attributes change, then the computing apparatus ID 360 cannot be recovered (i.e., not enough secret shares can be decrypted), and the computing apparatus 300 will be considered a different device. When one or more of the device attributes change, the computing apparatus ID 360 can be re-shared, assigning new shares in the (k,n) scheme to each device identifier. In other implementations, the device attributes can be compared with values that are stored alongside the security key 370 or the encrypted information 335.

Figure 4:
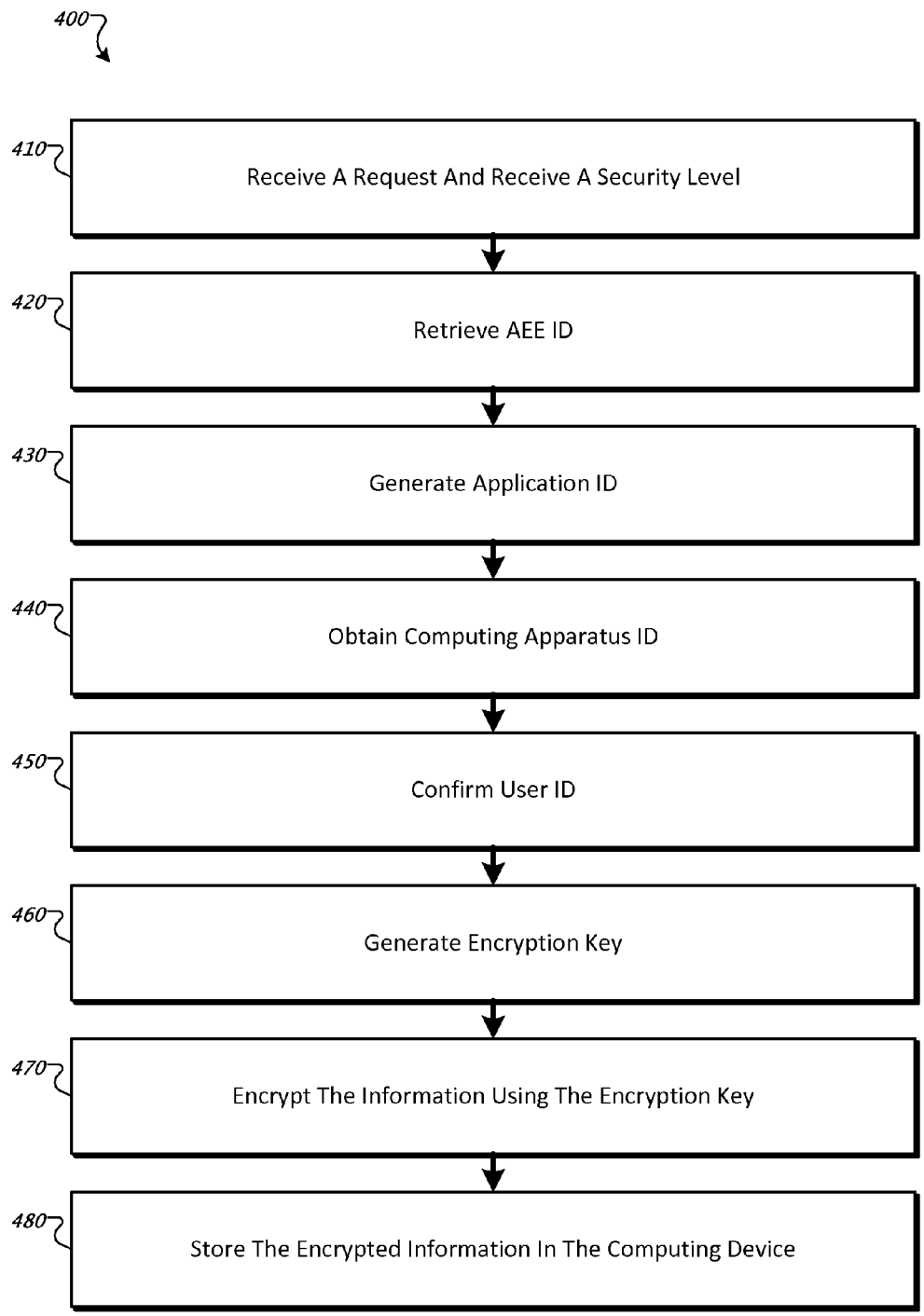
FIG. 4 shows another example process of providing local storage service to applications that run in an application execution environment.

FIG. 4 shows an example process 400 of providing local storage service to applications that run in an application execution environment (e.g., the application execution environment 120 of FIG. 1, or the cross-OS application execution environment 320 of FIG. 3). A request can be received 410 from one of the applications that requires local storage of information, and a security level indication can be received 410 for the information. This can involve receiving a single request, having the security level information associated therewith, or this can involve receiving two requests.

For example, the application can be the media player application 325, which is directed to play a media file from the media server 380. When the media player application 325 requests access to the media file, through the cross-OS application execution environment 320, the cross-OS application execution environment 320 can request the media file and a corresponding decryption key from the media server 380. This type of information can be considered highly critical/confidential and thus not allowed to cross a security boundary between the cross-OS application execution environment 320 and the media player application 325 (e.g., the media player application 325 may operate in a security sandbox on the computing apparatus and not be trusted to have access to the decryption key provided by the media server 380). The cross-OS application execution environment 320 may want to cache the decryption key locally for later use, in which case, the cross-OS application execution environment 320 can generate an internal request for local storage service as described herein. In this case, two requests are received: a first request from the media player application 325 for access to the media file, and a second request from the cross-OS application execution environment 320 for the local storage service. The second request can have an associated security level derived from the nature of the requestor (e.g., the second request can be made through an API accessible by the cross-OS application execution environment 320, but not the media player application 325).

The locally cached, and secured, media file decryption key can then be used (after decryption of this key using the key 370) to decrypt the media file (e.g., streaming media content), and the decrypted media frames can be provided to the media player application 325. While the media content is playing, the media player application 325 can record information. For example, the media player application 325 can generate an audit record that describes various aspects of the user's interaction with a media file (e.g., how many times, and which portions of, the media file has been played, whether and how many times an associated advertisement has been displayed to the user, etc.). Such information can be synchronized with the media server 380, but in some cases, this information may need to be cached locally in a secure fashion. For example, when the computing apparatus 300 is offline, the audit record can be securely cached locally, and this locally cached data can be synchronized with the media server 380 at a later time, when the network 390 becomes available once again. Thus, the media player application 325 can request that cross-OS application execution environment 320 store the information 330 (generated by the application 325) on the behalf of the media player application 325. In this case, a single request is received (as described above in the context of FIG. 4): a request from the media player application 325 for the local storage service. This request can have an associated security level derived from the nature of the requestor (e.g., this request can be made through an API used by the applications rather than the cross-OS application execution environment 320).

Thus, the security level indication can be implicit in the nature of the request for local storage service, as received. In other implementations, the security level can be explicitly assigned, and different levels of security can be provided for both the application execution environment and the applications, including potentially different levels of security for the same application. For example, in some implementations, the media player application 325 can store different sets of information using different security level IDs 352.

An application execution environment ID can be retrieved 420. As described above, the application execution environment ID can be derived from data in the application execution environment, from a hash (e.g., SHA) or checksum of the application execution environment code, from a value stored during installation, or by some other value that can be used to identify the application execution environment.

An application ID can be generated 430 for the application. For example, the application ID can be dynamically generated at the time the request is received 410 by applying a cryptographic hash function (e.g., SHA) to the application making the request. This cryptographic hash function can be applied to all the program code of the application, or to just one or more portions thereof.

A computing apparatus ID can be obtained 440 to identify the computing apparatus in which the application is running. The computing apparatus ID can be generated by hashing or otherwise combining a collection of attributes that are associated with various components of the computing apparatus. For example, some processor modules include a unique serial number that may be read electronically, and many network interface cards include a MAC address that is globally unique. These and various other attributes of components of the computing apparatus can be used to generate a computing apparatus ID. Alternatively, the computing apparatus ID can be retrieved from storage using a (k,n) threshold secret sharing scheme, as described above.

The user ID can be confirmed 450 by accessing a key or other data (e.g., one or more of the identifiers described above) that has been previously stored in local storage using the user's ID. For example, the application execution environment can make a request to a local storage encryption interface provided by an operating system of the computing apparatus to determine if the key or other data can be retrieved by using the user's ID. For example, on a computing apparatus running a WINDOWS® Operating System (available from the Microsoft Corporation of Redmond, Wash.) the Data Protection Application Programming Interface (DPAPI) can be used, and on a computing apparatus running the Apple MAC OS® X platform (available from Apple, Inc. of Cupertino, Calif.) Keychain Services can be used. If the key or other data can be accessed successfully in this manner, the user's identity can thereby be implicitly confirmed.

The security level ID, the application execution environment ID, the application ID, the computing apparatus ID, and the user ID can be used to generate 460 an encryption key. In some implementations, the encryption key can be a concatenation or other combination of the identifiers. In some implementations, the encryption key can be a hash or other code that is generated from the identifiers.

The information can be encrypted 470 using the encryption key. For example, the encryption key can be used in a PGP, AES, or other encryption process. In another example, the encryption key can be provided to an encryption algorithm that may be provided by the OS or otherwise available to perform encryption of the information. For example, the application execution environment may access APIs that are exposed by the OS, and use those API's to perform various encryption processes. Examples of APIs that the application execution environment may use include, but are not limited to DPAPI and Keychain Services.

In some implementations, the application execution environment can perform encryption functions for applications that run on the application execution environment to increase the security of security keys and/or encrypted information. For example, by performing encryption functions in the application execution environment, security keys, cryptographic code, or other sensitive information may not be exposed to applications running on the application execution environment, since those applications may be tampered with more easily than the application execution environment.

Once the information is encrypted, the encrypted information can be stored 480 in the computing device. The encrypted data may be stored in volatile or nonvolatile memory, on a hard disk, an optical disk, or some other form of computer readable medium. Moreover, the encrypted information is then available for decryption and access, through the application execution environment, provided the requisite identifiers are in place.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. Moreover, in some implementations, portions of the required identifiers can be downloaded from a trusted server. For example, portions of the IDs 345-360 can be downloaded from a trusted server during an installation or activation process, or even during the encryption/decryption process, since this can help to prevent tampering or disclosure of data. Furthermore, obtaining an encryption key based on the required identifiers can involve obtaining multiple encryption keys (e.g., one key for each of five required identifiers), and the information to be secured can be encrypted multiple times using the multiple keys (e.g., five times using five keys in a sequence).

What is claimed is:

1. A computer-implemented method for providing local storage service to applications that run in an application execution environment on a computing apparatus, wherein the application execution environment comprises a cross-operating system (OS) application execution environment, the method comprising:
   receiving a request from one of the applications, wherein the request triggers local storage of information;
   receiving a security level indication for the information, wherein receiving the security level indication comprises receiving a request from a requestor to store the information, wherein the security level indication corresponds to the requestor being either the one of the applications or the cross-OS application execution environment;
   obtaining an encryption key based on a first identifier corresponding to the application execution environment, a second identifier corresponding to the one application, a third identifier corresponding to the computing apparatus, a fourth identifier corresponding to the security level indication, and a fifth identifier corresponding to a current user of the one application;
   encrypting the information using the encryption key; and
   storing the encrypted information in the computing apparatus.

2. The method of claim 1, comprising retrieving the third identifier using a (k,n) threshold secret sharing scheme.

3. The method of claim 1, wherein obtaining the encryption key comprises generating a composite key using the identifiers as input.

4. The method of claim 3, comprising generating the second identifier dynamically by applying a cryptographic hash function to program code comprising at least a portion of the one application.

5. The method of claim 3, wherein the identifiers comprise encryption keys, and generating the composite key comprises combining the encryption keys to form the composite key.

6. A computer program product, encoded on a non-transitory computer-readable medium, operable to cause data processing apparatus to perform operations providing local storage service to applications that run in an application execution environment on a computing apparatus, wherein the application execution environment comprises a cross-operating system (OS) application execution environment, the operations comprising:
   receiving a request from one of the applications, wherein the request triggers local storage of information;
   receiving a security level indication for the information, wherein receiving the security level indication comprises receiving a request from a requestor to store the information, wherein the security level indication corresponds to the requestor being either the one of the applications or the cross-OS application execution environment;
   obtaining an encryption key based on a first identifier corresponding to the application execution environment, a second identifier corresponding to the one application, a third identifier corresponding to the computing apparatus, a fourth identifier corresponding to the security level indication, and a fifth identifier corresponding to a current user of the one application;
   encrypting the information using the encryption key; and
   storing the encrypted information in the computing apparatus.

7. The computer program product of claim 6, the operations comprising retrieving the third identifier using a (k,n) threshold secret sharing scheme.

8. The computer program product of claim 6, wherein obtaining the encryption key comprises generating a composite key using the identifiers as input.

9. The computer program product of claim 8, the operations comprising generating the second identifier dynamically by applying a cryptographic hash function to program code comprising at least a portion of the one application.

10. The computer program product of claim 8, wherein the identifiers comprise encryption keys, and generating the composite key comprises combining the encryption keys to form the composite key.

11. A system comprising:

a computing apparatus comprising a computer-readable medium, a user interface device and a processor;

the computer-readable medium encoding a computer program product operable to cause the processor to perform operations providing local storage service to applications that run in an application execution environment on the computing apparatus, wherein the application execution environment comprises a cross-operating system (OS) application execution environment, the operations comprising:

receiving a request from one of the applications, wherein the request triggers local storage of information;

receiving a security level indication for the information, wherein receiving the security level indication comprises receiving a request from a requestor to store the information, wherein the security level indication corresponds to the requestor being either the one of the applications or the cross-OS application execution environment;

obtaining an encryption key based on a first identifier corresponding to the application execution environment, a second identifier corresponding to the one application, a third identifier corresponding to the computing apparatus, a fourth identifier corresponding to the security level indication, and a fifth identifier corresponding to a current user of the one application;

encrypting the information using the encryption key; and storing the encrypted information in the computing apparatus.

12. The system of claim 11, the operations comprising retrieving the fourth identifier using a (k,n) threshold secret sharing scheme.

13. The system of claim 11, wherein obtaining the encryption key comprises generating a composite key using the identifiers as input.

14. The system of claim 13, the operations comprising generating the second identifier dynamically by applying a cryptographic hash function to program code comprising at least a portion of the one application.

15. The system of claim 13, wherein the identifiers comprise encryption keys, and generating the composite key comprises combining the encryption keys to form the composite key.

16. The system of claim 11, further comprising a data communication network and a media server.

17. The system of claim 16, wherein the request from the one application is a request for encrypted media content from the media server, and the request from the requestor is a request from the cross-OS application execution environment to store a content key received from the media server.

18. The system of claim 16, wherein the request from the one application is the request from the requestor, which request is a request to store information describing usage of media content.

* * * * *